(No Model.)  2 Sheets—Sheet 1.

W. H. JONES.
APPARATUS FOR OPERATING GLASS MOLDS.

No. 490,908.  Patented Jan. 31, 1893.

(No Model.) 2 Sheets—Sheet 2.

W. H. JONES.
APPARATUS FOR OPERATING GLASS MOLDS.

No. 490,908. Patented Jan. 31, 1893.

WITNESSES:
L. Douville
O. H. Dagle

INVENTOR
William H. Jones
BY
John A. Wiedersheim
ATTORNEY.

THE NORRIS PETERS CO., PHOTO-LITHO., WASHINGTON, D. C.

UNITED STATES PATENT OFFICE.

WILLIAM H. JONES, OF GLASSBOROUGH, NEW JERSEY, ASSIGNOR TO THE WHITNEY GLASS WORKS, OF SAME PLACE.

APPARATUS FOR OPERATING GLASS-MOLDS.

SPECIFICATION forming part of Letters Patent No. 490,908, dated January 31, 1893.

Application filed April 18, 1892. Serial No. 429,638. (No model.)

*To all whom it may concern:*

Be it known that I, WILLIAM H. JONES, a citizen of the United States, residing at Glassborough, in the county of Gloucester and State of New Jersey, have invented a new and useful Improvement in Apparatus for Operating Glass-Molds, which improvement is fully set forth in the following specification and accompanying drawings.

My invention consists of means substantially as hereinafter described, for automatically opening the sections of a mold.

It further consists of mechanism substantially as hereinafter described, for uniformly closing said sections.

It further consists of mechanism substantially as hereinafter described for closing one of the sections independently of the other.

Figure 1:
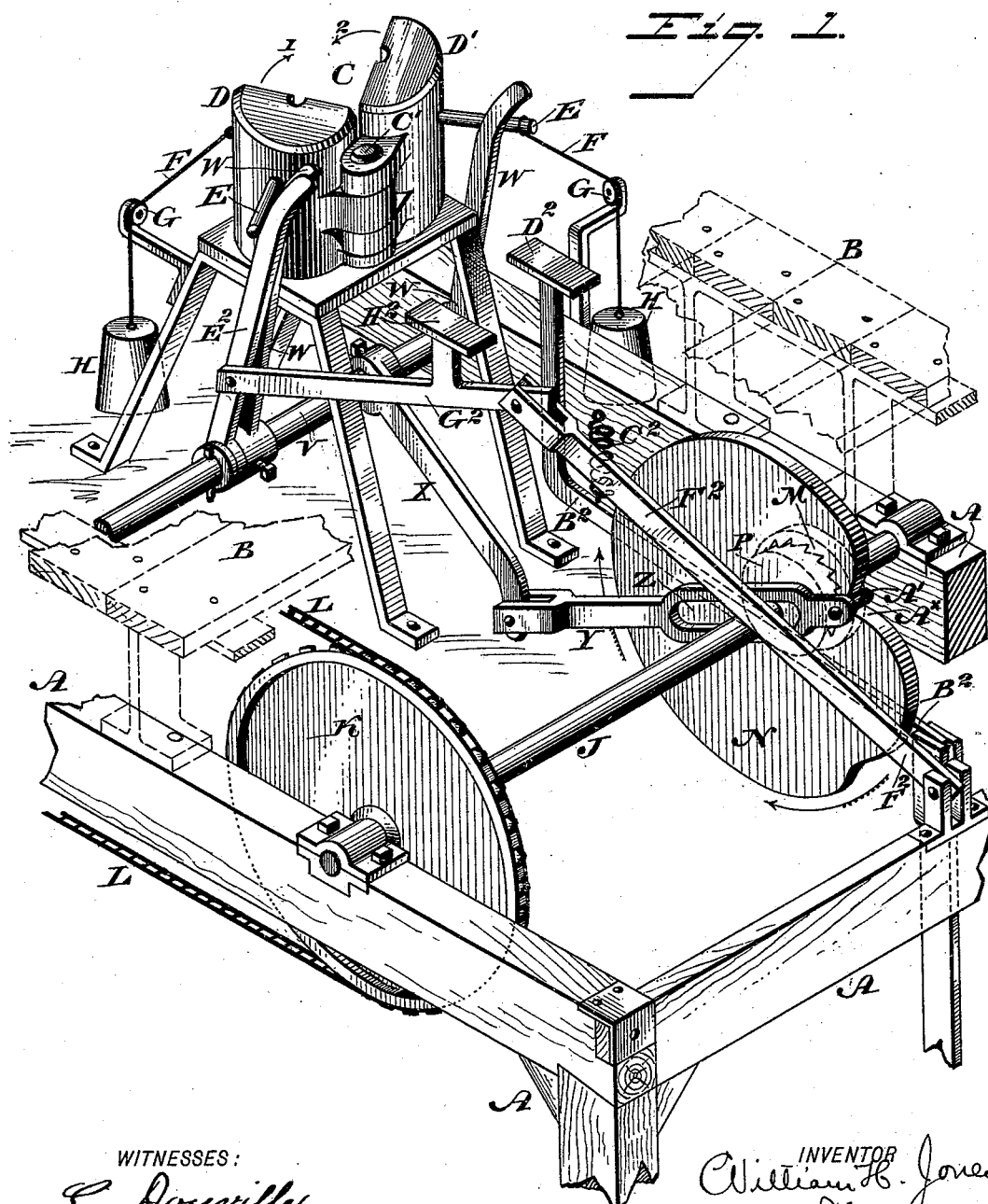
Figure 2:
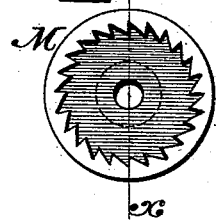
Figure 3:
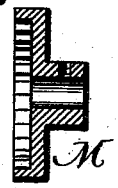
Figure 4:
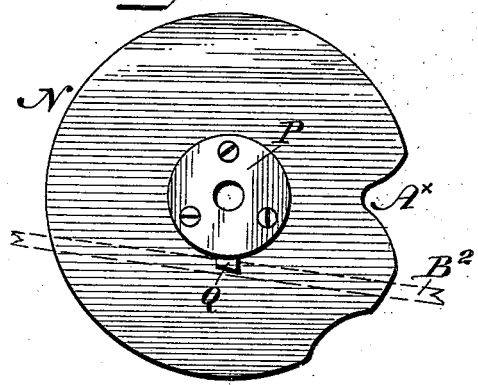
Figure 5:
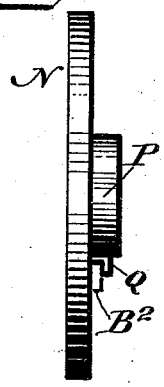
Figure 6:
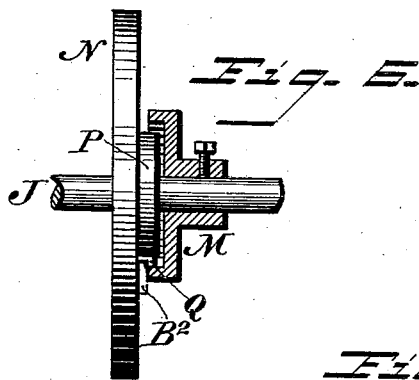
Figure 7:
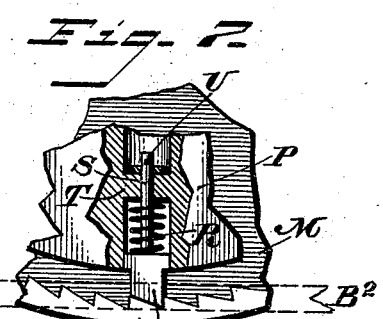
Figure 8:
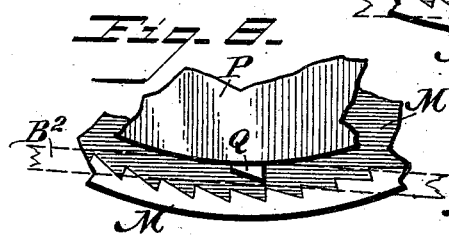

Figure 1 represents a perspective view of an apparatus embodying my invention. Fig. 2 represents a side view of a ratchet wheel employed in the invention. Fig. 3 represents a sectional view on line $x$, $x$, Fig. 2. Figs. 4 and 5 represent side and edge views respectively of a cam wheel employed in the invention. Fig. 6 represents a partial edge and partial sectional view of the parts shown in Figs. 2 and 4, in operative position. Fig. 7 represents a sectional view of a detached portion of the apparatus on an enlarged scale. Fig. 8 represents a side view of the same parts the pawls thereof being in a different position from that shown in Fig. 7.

Similar letters of reference indicate corresponding parts in the several figures.

Referring to the drawings: A designates the frame of the apparatus, and B a flooring or platform on which the glass blower stands, a portion of said flooring being removed, and shown in dotted lines, for clearness of the other parts.

C designates a mold for forming glass articles of any desired construction, being formed in sections D, D' which are hinged on the pintle C', so that each section is adapted to be swung outwardly or from the other, by means of the handles or rods E connected therewith. Attached to each section of the mold are the cords F, which are passed over the pulleys G, and have the weights H attached to their ends, whereby the sections are adapted to be swung outwardly or opened.

J designates a rotary shaft having the sprocket wheel K thereon, whereby it receives motion by means of the sprocket chain L from any suitable motor. The shaft J is mounted on the frame A, and has a ratchet wheel M secured thereon, so as to rotate therewith, and a cam wheel N, which latter is loosely mounted thereon. The said ratchet wheel M has its teeth formed on the inner face of the peripheral rim of the disk P, which is mounted on the shaft J, and is connected with the cam wheel so as to rotate therewith. A pawl Q movable in a recess in the disk P, is forced by a spring R into engagement with the ratchet teeth, so as to couple the ratchet wheel and cam, and thereby cause the rotation of the shaft J to rotate said cam. The said pawl is connected with the disk P by means of a stem S, which moves freely in a wall T in the disk, and has a pin U in its end preventing its displacement.

V designates a rock shaft journaled in the frame A, having the fixed arms W thereon, the latter bearing against the rods E, so as to normally keep the sections of the mold closed. Secured to the rock shaft V is a toggle lever formed of the limbs X and Y, the limb Y having a recess or slot Z therein, through which passes the shaft J. On the free end of the lever Y, is a pin or stud A' projecting laterally therefrom, and bearing against the periphery of the cam N. It will be seen that the rotation of the cam N, which is of suitable form to provide for the different movements required, will cause the toggle levers Y and X to rock the shaft V, and thereby the arms W, so as to move the same either to or from the rods E, and thereby either close partially or wholly the sections of the mold, or else to permit the weighted cords F to open the same. To disengage the pawl and ratchet so as to stop the rotation of the cam, and thereby permit the mold to remain open a lever $B^2$ is employed, the same being pivoted to the frame A, and having a spring $C^2$ attached to it and the frame A, causing it to bear against a portion of the underface of the pawl Q, and thereby remove the said pawl from contact with the ratchet teeth of the wheel M, said lever B² being provided with a treadle D² so as to be readily operated by means of the foot of the workman thereon. To close one of the sections of the mold in advance of the other, I employ an arm E² which bears against one of the rods E, and is loosely mounted on the shaft V, it being also connected with a toggle lever, one of the members F² of which is pivoted to the frame A, and the other G² is provided with a foot piece or treadle H². The treadles D² and H² are in close proximity to each other, so as to permit their operation by the same workman at slight intervals of time.

The manner of operating the apparatus is as follows: The parts being in position, as shown in Fig. 1, and it is desired to close the mold, the workman presses the treadle D², whereby the lever B² is depressed, so that it bears no longer against the pawl Q. As the latter is released it is forced outward by the spring R, so as to engage the ratchet wheel M, and thereby act as a clutch to connect the said cam to the shaft J. The rotation of the cam N against which the pin A' rests, operates the toggle lever Y and X, the limb Y of which, owing to the slot Z being guided on the shaft J, so that the shaft V is rocked, and the arms W thereon, which bear against the rods E, cause said rods to move each section D, D' of the mold in the direction of the arrows 1 and 2, Fig. 1, thus closing the mold. The cam N, as shown, is so formed that the mold is but partially opened at first, and then closed, after which it is entirely opened. When the depression or recess A<sup>×</sup> in the cam N, reaches the pin A' in the lever Y, the spring actuated pawl Q in the disk P, bears against the lever B², as shown in Figs. 4 and 8, thereby disengaging said pawl from the teeth of the ratchet wheel M, and thus stopping the rotation of the cam N. The pin A' and pawl Q being in the position just described will cause the mold to remain open until the treadle D² is again depressed.

When it is desired to close the section D of the mold, in advance of the other section, the workman presses upon the treadle H², thus operating the toggle lever G², F², and as the arm E² connected with the member G² is loosely fitted on the shaft V, it is forced against the rod E of the section D, thereby moving the same, without actuating the shaft V. The weight of said levers F², G², and the position of said arm E² relative to the rod E, is such that at all times the said arm E² is in contact with the said rod.

Having thus described my invention, what I claim as new and desire to secure by Letters Patent, is—

1. An apparatus for the purpose set forth having a hinged sectional mold provided with arms, mechanism substantially as described connected with said arms for opening the said sections, and mechanism having arms bearing against said arms on the mold for closing said sections, said parts being combined substantially as described.

2. In an apparatus for the purpose set forth, mechanism connected with the sections of a mold for automatically opening the same, a rock shaft with arms rigidly connected therewith and bearing against said sections so as to close the same, a toggle lever having one of its members rigidly attached to said shaft, and the other member having a recess or slot therein, and a shaft or support on which said slotted member moves, said parts being combined substantially as described.

3. In an apparatus for the purpose set forth, mechanism connected with the sections of a mold for opening the same, a rock shaft with arms bearing against said sections, a rotary shaft, a toggle lever having one of its members connected with said rock shaft and its other member supported and guided on said rotary shaft, and a cam loosely mounted on the rotary shaft for connecting the said cam and shaft, said parts being combined substantially as described.

4. In an apparatus for the purpose set forth, mechanism bearing against and closing the sections of a mold, a cam loosely mounted on a shaft, clutch mechanism secured to said shaft for connecting the said shaft and cam, and a treadle operating said clutch mechanism, said parts being combined substantially as described.

5. In an apparatus for the purpose set forth, mechanism connected with the sections of a mold for automatically opening the same, a rock shaft with an arm loosely mounted thereon and in contact with one of the sections of the mold, a toggle lever pivoted to said arm and to a suitable support, and a foot piece connected with said toggle lever, said parts being combined substantially as described.

6. In an apparatus for the purpose set forth, the combination of a rotary shaft, with a wheel secured thereto, a cam wheel loosely mounted on said shaft, a disk secured to said cam, a spring pawl movable in said disk and normally engaging in said ratchet wheel, and a spring-actuated lever bearing against said pawl, substantially as described.

WILLIAM H. JONES.

Witnesses:
JOHN A. WIEDERSHEIM,
WM. C. WIEDERSHEIM.